C. GARDNER.
DRILL MOUNT.
APPLICATION FILED OCT. 14, 1909.
1,004,160.
Patented Sept. 26, 1911.
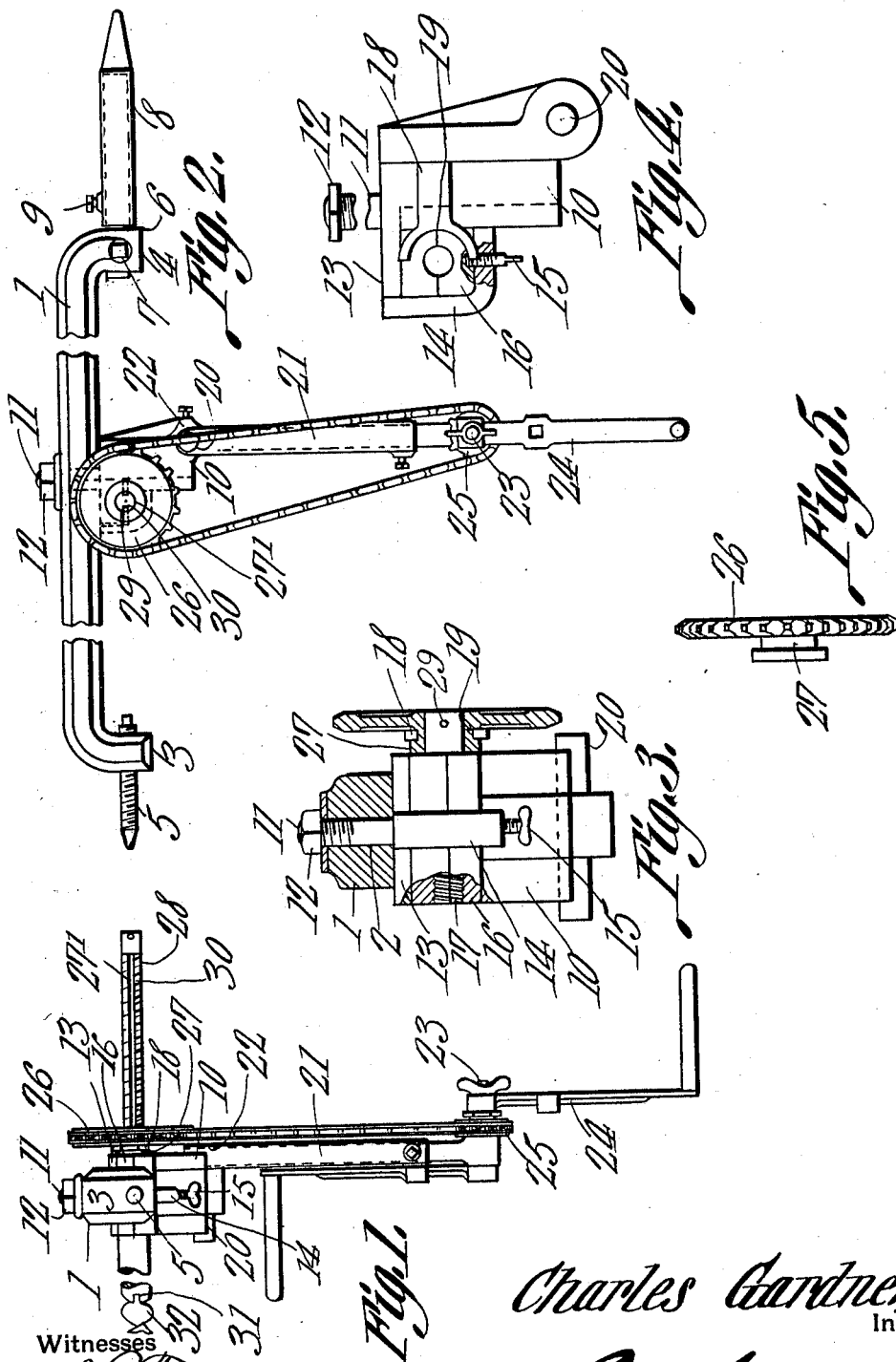
Witnesses
Charles Gardner,
Inventor
by C. A. Snow & Co.
Attorneys

UNITED STATES PATENT OFFICE.

CHARLES GARDNER, OF CLINTON, INDIANA.

DRILL-MOUNT.

1,004,160.  Specification of Letters Patent.  Patented Sept. 26, 1911.

Application filed October 14, 1909. Serial No. 522,663.

*To all whom it may concern:*

Be it known that I, CHARLES GARDNER, a citizen of the United States, residing at Clinton, in the county of Vermilion and State of Indiana, have invented a new and useful Drill-Mount, of which the following is a specification.

This invention has relation to drill mounts and it consists in the novel construction and arrangement of its parts as hereinafter shown and described.

The object of the invention is to provide a drill mounting structure especially adapted to be used for supporting a drill during the operation of such a tool in coal mines but the mount may also be used to advantage for supporting drills in drifts or tunnels generally.

With the above object in view the mount comprises a column longitudinally slotted and upon which is adjustably mounted a block. A head pin is screw threaded in one end of the bar and a longitudinally extensible pedestal is attached to the other end of the bar. A clamping device is mounted upon the said block and is adapted to hold sectional feed blocks, a threaded drill shank engages the feed blocks and is slotted or grooved longitudinally. A bearing is provided upon the first said block in which is journaled a sprocket wheel having an open center provided with inwardly disposed lugs which lie in the grooves of the drill shank. A longitudinally extensible arm is pivotally connected with the said block and an arbor is journaled for rotation at the outer or free end of the said arm. Crank handles are fixed to the ends of the arbor and a sprocket wheel is fixed to the arbor. A sprocket chain is adapted to move in an orbit about the peripheries of the said sprocket wheel.

In the accompanying drawings: Figure 1 is an end view of the drill mount. Fig. 2 is a side view of the same. Fig. 3 is a transverse sectional view of the bar forming a component part of the column of the drill mount. Fig. 4 is a side elevation of a block used upon the bar of the drill mount. Fig. 5 is an edge elevation of a sprocket wheel used in conjunction with the drill mount.

The drill mount includes a column which is made up of a bar 1 which is longitudinally slotted as at 2 and which is provided with laterally disposed ends 3 and 4. A head pin 5 is screw threaded in the end 3 of the bar 1 and a tail pin 6 is fixed in the end 4 of the bar 1 and is held therein by means of a set screw 7. As shown in Fig. 2 of the drawings, a pedestal point 8 is adjustably mounted upon the tail pin 6 and may be fixed in an adjusted position by the use of a set screw 9 which passes transversely to the side of the pedestal point 8 and is adapted to come in contact with the side of the tail pin 6.

A block 10 is provided with a bolt 11 which projects through the slot 2 provided in the bar 1 and upon the end of which is screw threaded a nut 12. The said nut 12 serves as means for clamping the block 10 against the side of the bar 1. A shoulder 13 is formed upon the block 10 and upon the end of the said shoulder is fixedly mounted a clamp member 14. The said member 14 is rectangular in end elevation and a set screw 15 passes transversely through the end portion thereof other than that portion which is connected with the shoulder 13. A sectional bearing 16 is located under the shoulder 13 and the sections of the said bearing are held together by the set screw 15 which engages one of the sections of the bearing in a manner as illustrated in Fig. 4 of the drawings. The bearing 16 is provided with an internal screw thread 17. A bracket 18 is formed at one side of the block 10 and is provided with a shaft bearing 19 concentrically arranged with relation to the axis of the bearing 16. The block 10 is provided at its opposite sides with laterally disposed gudgeons 20.

A longitudinally extensible arm 21 made up of telescopic sections is provided at one end with a bearing 22 which is adapted to receive one or the other of the gudgeons 20. An arbor 23 is journaled for rotation at the other end of the arm 21 and crank handles 24 are mounted upon the ends of the said arbor 23. A sprocket wheel 25 is fixed to the intermediate portion of the arbor 23. A sprocket wheel 26 is provided with a laterally disposed flanged hub 27 and the said flanged hub is adapted to fit snugly within the shaft bearing 19 of the bracket 18. The sprocket wheel 26 is provided with a central opening which receives the drill shank 27', the said shank in turn having upon its peripheries a thread 28 which engages the thread 17 in the bearing 16 and the perforation in the wheel 26 is also provided with laterally disposed pins 29 which lie in grooves 30 which extend longitudinally of the shank 27'. The drill shank 27' is provided at one end with a socket 31 which is adapted to receive the end of a drill bit 32 in the usual manner.

From the above description it will be seen that a drill mount of simple structure and assemblage of parts is provided and that the block carried by the bar of the supporting column may be readily adjusted to position the drill properly against the work it is to perform. Also it will be seen that the extensible arm 21 and its attachments may be applied to either side of the block 10 and therefore the drill bit may be supported at either side of the said block and the column upon which it is mounted. The various adjustments and facilities for manipulating the parts and changing their positions render the structure especially desirable and advantageous for use in mine drifts and tunnels and other places where space is limited and obstructions numerous.

Having described my invention, what I claim as new and desire to secure by Letters Patent is:

A drill mount comprising a column, a block mounted upon the column, a half bearing carried by the block, a threaded bearing carried by the block, a bit shank having a thread engaging the thread in the threaded bearing and provided with a longitudinally disposed slot, a sprocket wheel having a flanged hub journaled in the half bearing and provided with a central opening which receives the bit shank and having a laterally disposed pin lying in the slot of the said shank, said block having a laterally disposed gudgeon, a longitudinally extensible arm having a bearing which receives said gudgeon, an arbor journaled for rotation in the free end of said arm, cranks fixed to the ends of the arbor, a sprocket wheel mounted upon the arbor, and a sprocket chain mounted for movement about both of said sprocket wheels.

In testimony that I claim the foregoing as my own, I have hereto affixed my signature in the presence of two witnesses.

CHARLES GARDNER.

Witnesses:
DANIEL C. JOHNSON,
LAVINIA NORTHWAY GARDNER.

---

Copies of this patent may be obtained for five cents each, by addressing the "Commissioner of Patents, Washington, D. C."